United States Patent
Shih et al.

(10) Patent No.: US 8,723,881 B2
(45) Date of Patent: May 13, 2014

(54) METHOD AND ELECTRONIC DEVICE FOR TACTILE FEEDBACK

(75) Inventors: Yu-Liang Shih, Changhua County (TW); Jung-Wen Chang, Tao Yuan Shien (TW)

(73) Assignee: Quanta Computer Inc., Tao Yuan Shien (TW)

(*) Notice: Subject to any disclaimer, the term of this patent is extended or adjusted under 35 U.S.C. 154(b) by 322 days.

(21) Appl. No.: 13/368,357

(22) Filed: Feb. 8, 2012

(65) Prior Publication Data

US 2012/0327100 A1 Dec. 27, 2012

(30) Foreign Application Priority Data

Jun. 21, 2011 (TW) .............................. 100121716 A

(51) Int. Cl.
| | |
|---|---|
| G09G 5/00 | (2006.01) |
| G09G 5/10 | (2006.01) |
| G06F 3/041 | (2006.01) |
| G06K 7/00 | (2006.01) |
| G06K 9/36 | (2006.01) |
| G06K 9/40 | (2006.01) |
| G06K 9/03 | (2006.01) |

(52) U.S. Cl.
CPC . *G06K 9/03* (2013.01); *G06K 3/048* (2013.01)
USPC ........... 345/589; 345/600; 345/606; 345/173; 345/690; 382/237; 382/276; 382/312

(58) Field of Classification Search
USPC ......... 345/581, 589, 596, 600–601, 605–606, 345/619, 156, 173–175, 177, 690; 348/254, 348/576, 601, 671; 358/1.1, 1.9, 3.01, 3.03; 382/169, 237, 252, 254, 274, 276, 300, 382/312–315
See application file for complete search history.

(56) References Cited

U.S. PATENT DOCUMENTS

| | | | |
|---|---|---|---|
| 7,924,144 B2 | 4/2011 | Makinen et al. | |
| 2008/0303942 A1* | 12/2008 | Chang et al. .................. | 348/468 |
| 2010/0163632 A1* | 7/2010 | Tseng et al. .................. | 235/494 |
| 2010/0275163 A1* | 10/2010 | Gillespie et al. ............. | 715/810 |
| 2011/0227947 A1* | 9/2011 | Benko et al. ................. | 345/650 |
| 2012/0165071 A1* | 6/2012 | Hsu et al. ...................... | 455/557 |

FOREIGN PATENT DOCUMENTS

CN 101836175 A 9/2010

* cited by examiner

*Primary Examiner* — Wesner Sajous
(74) *Attorney, Agent, or Firm* — Rabin & Berdo, P.C.

(57) ABSTRACT

A method and an electronic device for tactile feedback are provided. An original image is input and converted to a binary image which includes a first grayscale value and a second grayscale value. The original image is converted to a grayscale image at least including a third grayscale value between the first grayscale value and the second grayscale value. An index map is generated according to the binary image and the grayscale image. The index map includes a plurality of index values indicative of different strengths for tactile feedback. A touch input on a touch panel is detected when the original image is displayed on a display panel. In response to the detected touch input, a tactile activation unit is driven to generate tactile feedback according to the index map.

14 Claims, 5 Drawing Sheets

METHOD AND ELECTRONIC DEVICE FOR TACTILE FEEDBACK

This application claims the benefit of Taiwan application Serial No. 100121716, filed Jun. 21, 2011, the subject matter of which is incorporated herein by reference.

TECHNICAL FIELD

The disclosure relates in general to a method and an electronic device for tactile feedback, and more particularly to a method and an electronic device for tactile feedback in response to a touch input.

BACKGROUND

Accompanied with overwhelming advancement of touch sensing techniques, a touch display panel becomes more and more prevalent in electronic devices. The touch display panel offers visual feedback and allows a user to manipulate the electronic device via touch inputs.

Compared to conventional user input devices such as a keyboard or buttons of an electronic device, the touch display panel provides relatively unsatisfactory touch feedback. More specifically, when a user performs touch inputs, a sense of contact at a fingertip or at a touch control pen may not be as apparent such that it is difficult for a user to certain whether a desired touch input is completed or to identify the number of contacts. Thus, a user often relies on visual feedback provided by the touch display panel to acquire an outcome of the touch input. However, this imposes extra visual loading on a user while also reduces manipulation conveniences of the electronic device.

BRIEF SUMMARY OF THE DISCLOSURE

The disclosure is directed to a method and an electronic device for providing tactile feedback associated with image content to enhance manipulation conveniences of the electronic device.

According to an example of the present disclosure, a tactile feedback method for an electronic device is provided. An original image is input, and converted to a binary image which comprises a first grayscale value and a second grayscale value. The original image is converted to a grayscale image, which at least comprises a third grayscale value between the first grayscale value and the second grayscale value. An index map is generated according to the binary image and the grayscale image. The index map includes a plurality of index values indicative of different strengths for tactile feedback. A touch input on a touch panel is detected when the original image is displayed on a display panel. In response to the detected touch input, a tactile activation unit is driven to generate tactile feedback according to the index map.

According to another example of the present disclosure, an electronic device for tactile feedback is provided. The electronic device includes a processing module, a display panel, a touch panel and a tactile activation unit. The display panel is coupled to the processing module. The touch panel is coupled to the processing module, and covers on the display panel. The tactile activation unit is coupled to the processing module. The processing module receives an original image, and converts the original image to a binary image having a first grayscale value and a second grayscale value. The processing module further converts the original image to a grayscale image at least having a third grayscale value that is between the first grayscale value and the second grayscale value. The processing module further generates an index map according to the binary image and the grayscale image. The index map includes a plurality of index values indicative of different strengths for tactile feedback. The processing module further detects a touch input on the touch panel when the original image is displayed on the display panel, and drives the tactile activation unit to generate tactile feedback according to the index map in response to the detected touch input.

It is to be understood that both the foregoing general description and the following detailed description are exemplary and explanatory only and are not restrictive of the disclosed embodiments, as claimed.

DETAILED DESCRIPTION OF THE DISCLOSURE

A method and an electronic device for tactile feedback according to an embodiment of the present disclosure shall be described below. The method and the electronic device for tactile feedback of the embodiment provide tactile feedback associated with image content to enhance manipulation conveniences. By offering the tactile feedback, user does not heavily rely on visual feedback and user experiences are enhanced. In addition, manipulation conveniences are further enhanced by improving unsatisfactory tactile feedback of point-touch operations.

Figure 1:
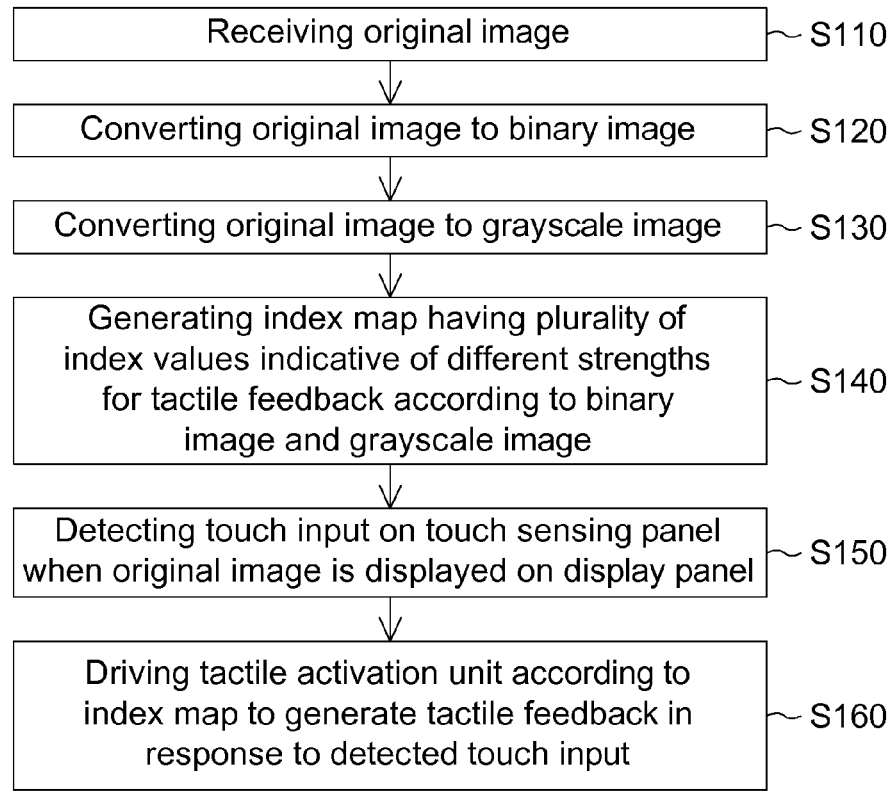
FIG. 1 is a flowchart of a tactile feedback method for an electronic device according to an embodiment of the present disclosure.

FIG. 1 shows a flowchart of a tactile feedback method for an electronic device according to an embodiment of the present disclosure. Step S110 includes inputting an original image. Step S120 includes converting the original image to a binary image, which includes a first grayscale value and a second grayscale value. Step S130 includes converting the original image to a grayscale image, which at least includes a third grayscale value between the first grayscale value and the second grayscale value. Step S140 includes generating an index map according to the binary image and the grayscale image. The index map includes index values indicative of different tactile feedback strengths. Step S150 includes detecting a touch input on a display panel when the original image is displayed on the display panel. Step S160 includes driving a tactile activation unit according to the index map to generate tactile feedback in response to the detected touch input. Thus, tactile feedback associated with image content is provided to enhance manipulation conveniences of the electronic device.

Figure 2:
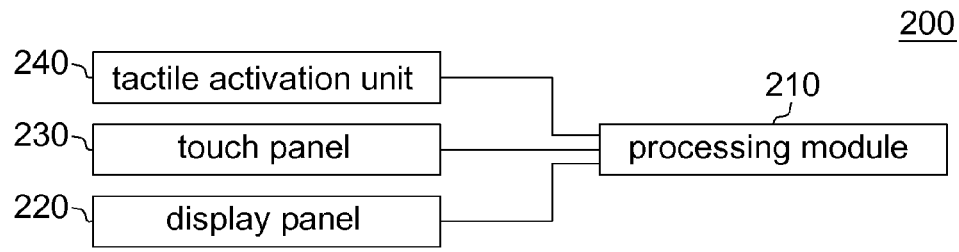
FIG. 2 is a block diagram of an electronic device according to an embodiment of the present disclosure.

FIG. 2 shows a block diagram of the electronic device according to one embodiment of the present disclosure. In the embodiment, the electronic device 200 includes a processing module 210, a display panel 220, a touch panel 230, and a tactile activation unit 240. The processing module 210 performs calculation operations. For example, the processing module 210 is a microprocessor. The display panel 220 displays information or images. For example, the touch panel 230 is a resistive, capacitive, optic or ultrasonic touch panel, or other types of touch panel. The touch panel 230 covers on top of the display panel 220 so that a touch region covers a display region. The tactile activation unit 240 generates tactile feedback, e.g., haptics. The processing module 210 is coupled to the display panel 220, the touch panel 230 and the tactile activation unit 240. The processing 210 detects a touch input on the touch panel 230, so as to correspondingly control display information on the display panel 220 to generate tactile feedback.

Figure 3:
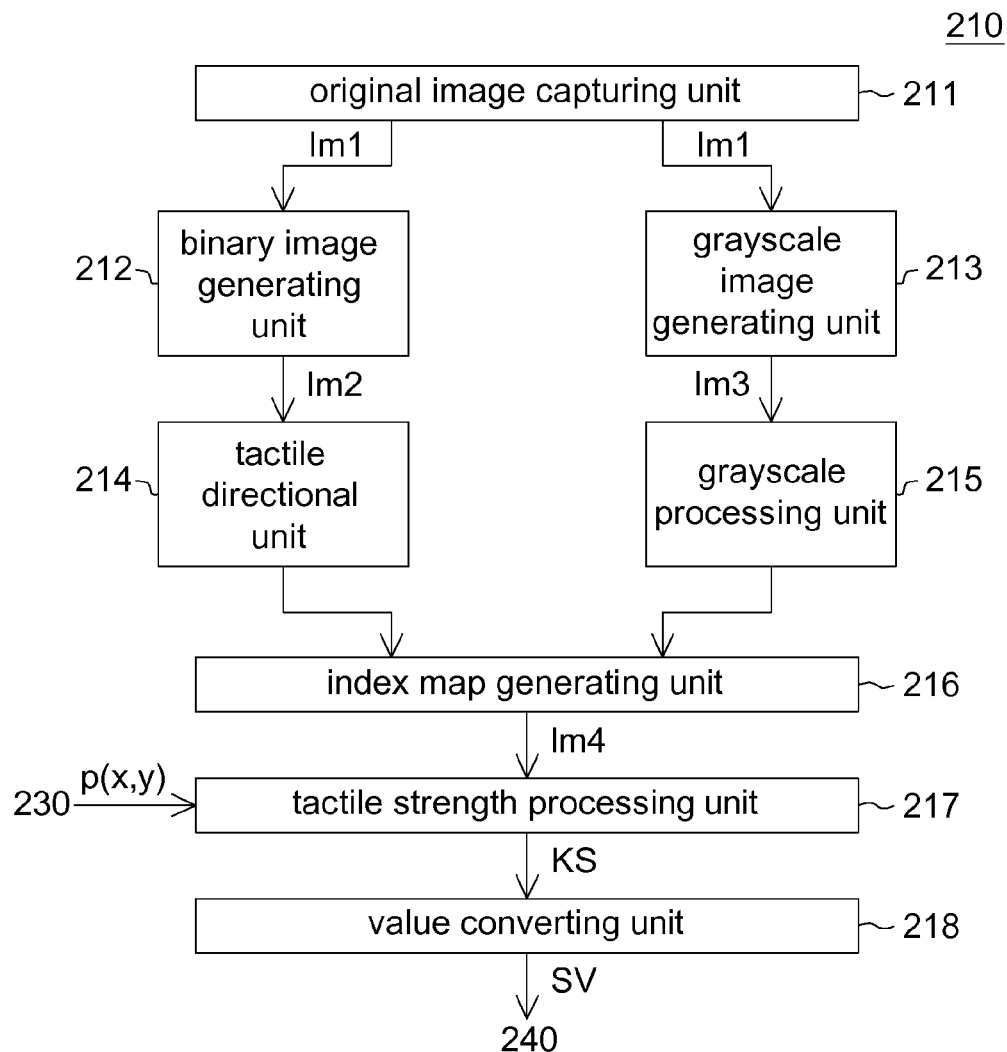
FIG. 3 is a schematic diagram of an example of a processing module of the electronic device in FIG. 2.

FIG. 3 shows a schematic diagram of an example of the processing module of the electronic device in FIG. 2. In this example, units 211 to 218 of the processing module 210 may be realized by software such as threads or program products, by hardware such as digital/analog logical circuits, or by firmware and its corresponding software driving program. For example, the electronic device 200 implements the tactile feedback method of the present embodiment through the units of the processing module 210, with details to be described later.

Step S110 includes inputting the original image. For example, an original image Im1 may be captured by an original image capturing unit 211. The original image Im1 may be an RGB image having R/G/B color information. However, the present disclosure is not limited thereto. In other examples, the original image Im1 may include image information defined under other color spaces.

In some embodiments, for example, the original image Im1 is retrieved from a graphic database in a memory by the original image capturing unit 211, or in further embodiment, the original image Im1 is obtained by a lens and a sensing element of the original image capturing unit 211. For example, the sensing element is a charge-coupling device (CCD) sensor or a complementary metal-oxide-semiconductor (CMOS) sensor. It should be noted that the source of the original image is not limited to the examples above but may be obtained through other approaches in other embodiments.

Step S120 includes converting the original image to the binary image. For example, the original image Im1 is converted to a binary image Im2 by a binary image generating unit 212. In this example, the binary image Im2 includes two grayscale values, e.g., the first grayscale value and the second grayscale value. For example, the two grayscale values respectively represent a maximum allowable grayscale value and a minimum allowable grayscale value.

In other embodiments, the binary image Im2 may be generated according to a threshold. For example, a threshold is determined through algorithms performed by the binary image generating unit 212, and grayscale values of the original image Im1 may be classified into two grayscale groups according to the threshold. Higher grayscale values than the threshold are adjusted to the maximum grayscale value; and lower grayscale values than the threshold are adjusted to the minimum grayscale. Vice versa.

The threshold may be adopted for image separation to classify the image into a foreground image (e.g., a main object) and a background image (e.g., other objects). In practice, statistical analysis may be performed on the grayscale values of the original image Im1 to obtain a grayscale statistical diagram, for example a histogram. According to distributions of grayscale values in the histogram, distribution characteristics of the grayscale values of the original image Im1 may be obtained to serve as reference for the image division.

The threshold may be determined by a number of approaches. In some embodiments, peaks and valleys of the histogram of the original image Im1 may be observed to manually set the threshold. In other embodiments, algorithms may be performed to automatically identify the threshold. The approaches for automatically identifying the threshold may be carried out according to luminance characteristics of objects, sizes of objects, areas or area ratios occupied by objects, or the number of types of objects. In practice, for example, the algorithms for automatically identifying the threshold includes a P-tile method, a Mode method, a Mean-Value method, or other methods known by a person skilled in the related art.

Step 130 includes converting the original image to the grayscale image. For example, the original image Im1 is converted to a grayscale image Im3 by a grayscale image generating unit 213. The grayscale image Im3 at least includes a third grayscale value between the first grayscale value and the second grayscale value.

In some embodiments, for example, the grayscale image Im3 is a luminance information of the original image Im1. For example, for one of pixels of the original image Im1, a luminance value of the pixel may be but not limited obtained by converting R/G/B image information of the pixel. For example, the luminance value is a mean value or a weighted sum of the R/G/B image information. In other embodiments, for example, the grayscale image Im3 is a Y component of the original image Im1, or other image information indicative of detail characteristics of the original image Im1.

The grayscale image Im3 may be utilized to generate diversified tactile feedback in different strengths. As the image is processed by binary processing, intermediate transitional grayscale information no longer exists. Therefore, a transitional area value may be provided from the grayscale image to serve as reference for tactile feedback strength.

Step S140 includes generating the index map according to the binary image and the grayscale image. For example, further processing is performed on the binary image Im2 and the grayscale image Im3 by a tactile directional unit 214 and a grayscale processing unit 215, respectively, and an index map Im4 is generated by an index map generating unit 216. The index map Im4 includes index values indicative of different tactile feedback strengths.

In some embodiments, the grayscale values of the binary image Im2 are selectively inverted. For example, the first grayscale value and the second grayscale value of the binary image Im2 are selectively switched by the tactile directional unit 214.

Selectively inversion of the grayscale value of the binary image may correspond a main object of the original image to a high-strength tactile feedback. Supposing a high grayscale value is for generating high-strength tactile feedback, grayscale inversion is not performed when an original grayscale value of the main object is a high grayscale value, or else the grayscale inversion is performed when the original grayscale value of the main object is a low grayscale value. Accordingly, the main object in the image has a high grayscale to correspond to high-strength tactile feedback.

Correct identification for a main object is important. In some embodiments, due to the fact that the main object occupies a smaller area in the image compared to the background, the number of grayscale values of the main object is relatively small. Therefore, the identification for the main object may be determined by the number of the two types of grayscale values of the binary image. It should be noted that the identification for the main object may also be realized through other approaches.

Figure 4:
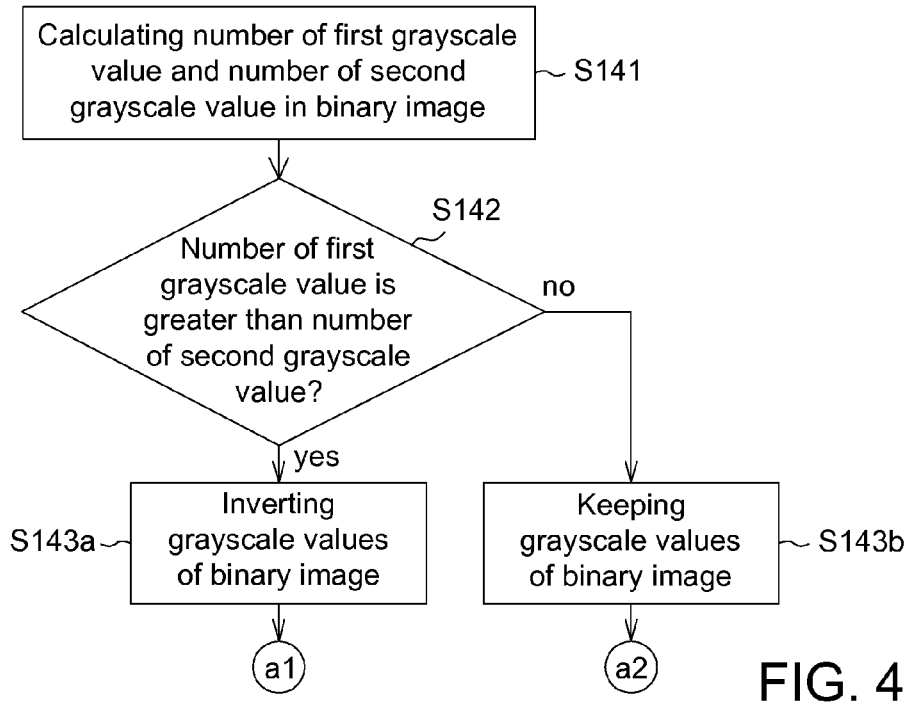
FIG. 4 is a part of step S140 in FIG. 1.

An example for illustrating how grayscale values of the binary image Im2 are selectively inverted shall be given below. FIG. 4 shows a part of Step S140 in FIG. 1. In Step S141, the tactile directional unit 214 calculates the number of the first grayscale value and the number of the second grayscale value in the binary image Im2. In Step S152, the tactile directional unit 214 judges whether the number of the first grayscale value is greater than the number of the second grayscale value. According to the judgment result, the tactile directional unit 214 determines whether to invert the grayscale values of the binary image. If it is judged that the number of the first grayscale value is greater than the number of the second grayscale value, the tactile directional unit 214 inverts the grayscale values of the binary image, as shown in FIG. S143a. If it is judged that the number of the first grayscale value is not greater than the number of the second grayscale value, the tactile directional unit 214 keeps the grayscale values of the binary image, as shown in FIG. S143b.

Figure 5:
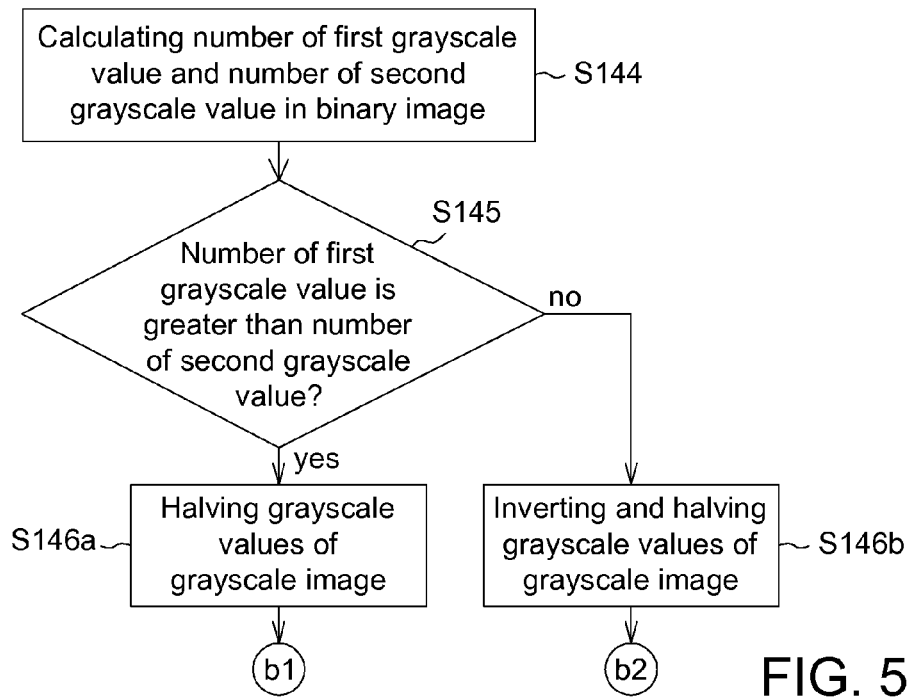
FIG. 5 is another part of step S140 in FIG. 1.

An example for illustrating how the grayscale values of the grayscale image Im3 are processed shall be given below. FIG. 5 shows another part of Step S140 in FIG. 1. In Step S144, the grayscale processing unit 215 calculates the number of the first grayscale value and the number of the second grayscale value in the binary image Im2. In Step S145, the grayscale processing unit 215 judges whether the number of the first grayscale value is greater than the number of the second grayscale value. If yes at Step S145, the flow enters Step S146a in which the grayscale processing unit 215 halves the grayscale values of the grayscale image Im3, or else the flow enters Step S146b in which the grayscale processing unit 215 inverts and halves the grayscale values of the grayscale image Im3.

Figure 6:
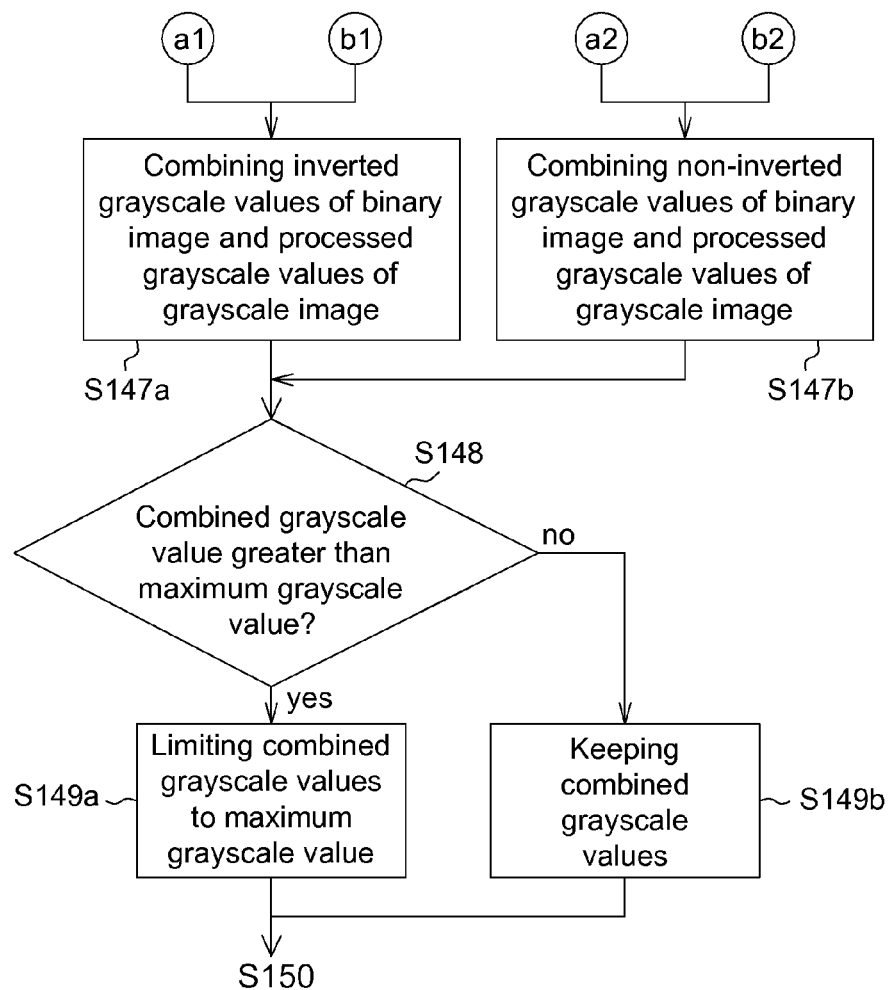
FIG. 6 is yet another part of step S140 in FIG. 1.

An example for illustrating how the index map Im4 is generated according to the binary image and the grayscale image shall be given below. FIG. 6 shows yet another part of Step S140 in FIG. 1. In Step S147a, the index map generating unit 216 receives results from Step S143a and S146a to combine the inverted grayscale values of the binary image Im2 and the processed grayscale values of the grayscale image Im3. In Step S147b, the index map generating unit 216 receives results from Step S143b and Step S146b to combine the non-inverted grayscale values of the binary image Im2 and the processed grayscale values of the grayscale image Im3. In Step S148, the index map generating unit 216 judges whether the combined grayscale value is greater than the maximum grayscale value. If yes at Step S148, the flow enters Step S149a in which the index map generating unit 216 limits the combined grayscale values greater than the maximum grayscale value to the maximum grayscale value; or else the flow enters Step S149b in which the index map generating unit 216 keeps the combined grayscale value. Thus, an index value in the index map Im4 is generated by combining a grayscale value in the binary image Im2 and a corresponding grayscale value in the grayscale image Im3.

Step S150 includes detecting the touch input on the touch panel when the original image is displayed on the display panel. For example, a corresponding index value KS in the index map Im4 is obtained according to a coordinate P(x,y) of a touch input by a tactile strength processing unit 217, and the index value KS is converted to a strength variable SV of the tactile activation unit 240 by a value converting unit 218.

In an embodiment, the conversion between the index value KS and the strength variable SV is for example, by multiplying a maximum strength of the tactile activation unit 240 by a ratio between the index value KS and the maximum grayscale value to generate the strength variable SV, for example based on an equation $SV=(KS/GH)*TS$, where GH represents the maximum grayscale value (e.g., 255), and TS represents the maximum strength of the tactile activation unit 240. This equation is a linear conversion. In practice, the index value KS may also be converted to the strength variable SV via non-linear or other approaches.

Step S160 includes driving the tactile activation unit according to the index map to generate tactile feedback in response to the detected touch input. For example, the strength variable SV is transmitted to the tactile activation unit 240 by the value converting unit 218, so as to drive the tactile activation unit 240 to generate tactile feedback.

In some embodiments, for example, the tactile activation unit 240 is a piezoelectric vibrator or a motor vibrator, which generates piezoelectric or vibration tactile feedback. However, it should be noted that the present disclosure is not limited thereto, and implementation of tactile feedback may also be dependent on other types of tactile activation units.

Figure 7:
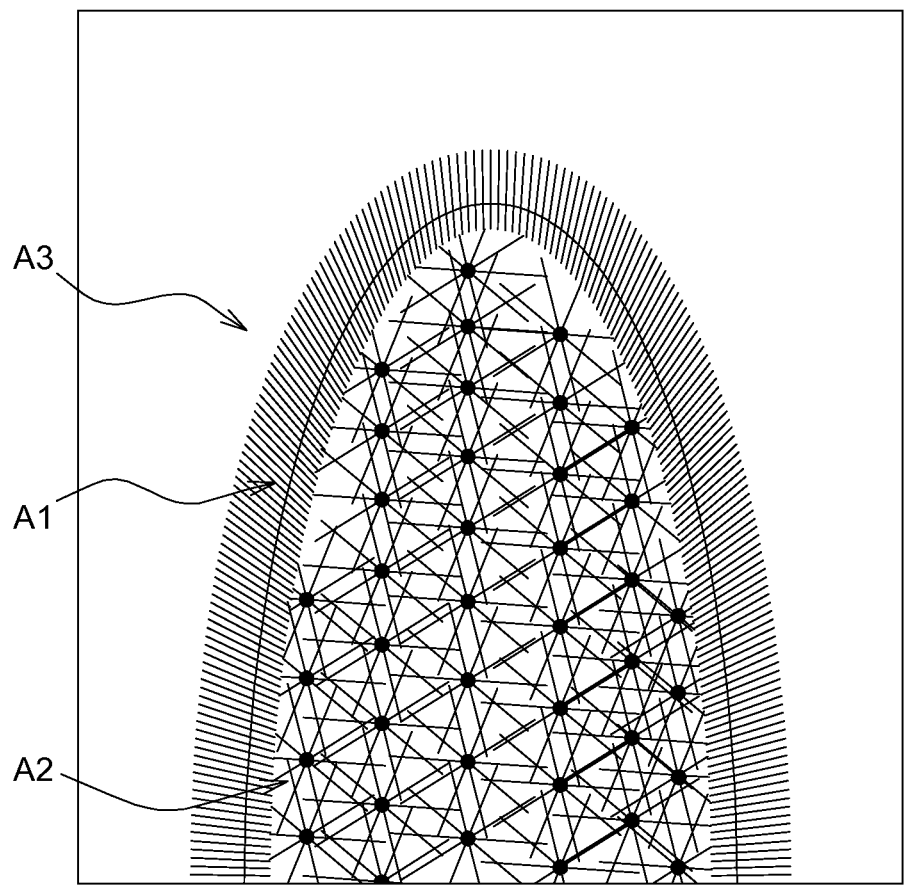
FIG. 7 is a schematic diagram of an example of an original image.

FIG. 7 shows a schematic diagram of an example of the original image. As shown in FIG. 7, the main object of the original image Im1 is a cactus in this example. After combining the binary image and the grayscale image, distributions of the index map Im4 are associated with the grayscale values of the original image Im1 while the main object corresponds to stronger tactile feedback. For coordinates A1, A2 and A3, suppose the coordinate A1 is located at the main object and has a grayscale value corresponding to strongest tactile feedback, the coordinate A2 is located at the main object and has a grayscale value corresponding to stronger tactile feedback, and the coordinate A3 is located at the background and has a grayscale value corresponding to weakest tactile feedback. Thus, different strengths for tactile feedback associated with image content may be provided.

In the method and the electronic device according to the above embodiment of the present disclosure, binary operations are performed on a foreground and a background of an image according to a threshold, to determine a main object generating tactile feedback, and a strength of tactile feedback is calculated based on grayscale values of the image. Thus, tactile feedback associated with image content is provided to enhance manipulation conveniences of the electronic device. By the tactile feedback, reliance on visual feedback for a user is reduced to enhance user experiences. In addition, manipulation conveniences are further optimized by improving unsatisfactory tactile feedback of point-touch operations.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. A tactile feedback method for an electronic device, comprising:
    inputting an original image;
    converting the original image to a binary image, the binary image comprising a first grayscale value and a second grayscale value;
    converting the original image to a grayscale image, the grayscale image at least comprising a third grayscale value between the first grayscale value and the second grayscale value;
    generating an index map according to the binary image and the grayscale image, the index map comprising a plurality of index values indicative of different strengths for tactile feedback;

detecting a touch input on a touch panel of the electronic device when the original image is displayed on a display panel; and driving a tactile activation unit of the electronic device to generate tactile feedback according to the index map in response to the detected touch input.

2. The method according to claim 1, wherein the binary image is generated according to a threshold.

3. The method according to claim 1, wherein before the step of generating the index map, the method further comprising:

selectively inverting the grayscale values of the binary image.

4. The method according to claim 3, wherein the step of selectively inverting the grayscale values of the binary image comprises:

calculating a number of the first grayscale value and a number of the second grayscale value in the binary image;

judging whether the number of the first grayscale value is greater than the number of the second grayscale value; and determining whether to invert the grayscale values of the binary image according to a judgment result.

5. The method according to claim 1, wherein an index value in the index map is generated by combining a grayscale value in the binary image and a corresponding grayscale value in the grayscale image.

6. The method according to claim 1, wherein the step of driving the tactile activation unit comprises:

obtaining an index value in the index map according to a coordinate of the touch input, and driving the tactile activation unit according to the index value.

7. The method according to claim 1, wherein the tactile activation unit generates piezoelectricity or vibration tactile feedback.

8. An electronic device for tactile feedback, comprising:
a processing unit;
a display panel, coupled to the processing module;
a touch panel, coupled to the processing module and covered on the display panel; and
a tactile activation unit, coupled to the processing module;
wherein, the processing module receives an original image, and converts the original image to a binary image, the binary image comprising a first grayscale value and a second grayscale value; the processing module further converts the original image to a grayscale image, the grayscale image at least comprising a third grayscale value between the first grayscale value and the second grayscale value; the processing module further generates an index map according to the binary image and the grayscale image, the index map comprising a plurality of index values indicative of different strengths for tactile feedback; the processing module further detects a touch input on the touch control panel when the original image is displayed on the display panel; and the processing module further drives the tactile activation unit according to the index map to generate tactile feedback in response to the detected touch input.

9. The electronic device according to claim 8, wherein the binary image is generated according to a threshold.

10. The electronic device according to claim 8, wherein the processing module further selectively inverts the grayscale values of the binary image before the processing module generates the index map.

11. The electronic device according to claim 10, wherein when the processing module selectively inverts the grayscale values of the binary image, the processing module calculates a number of the first grayscale value and a number of the second grayscale value in the binary image, judges whether the number of the first grayscale value is greater than the number of the second grayscale value, and determines whether to invert the grayscale values of the binary image according to a judgment result.

12. The electronic device according to claim 8, wherein an index value in the index map is generated by combining a grayscale value in the binary image and a corresponding grayscale value in the grayscale image.

13. The electronic device according to claim 8, wherein the processing module obtains a corresponding index value in the index map according to a coordinate of the touch input, and drives the tactile activation unit according to the index value.

14. The electronic device according to claim 8, wherein the tactile activation unit generates piezoelectricity or vibration tactile feedback.

* * * * *